Sept. 22, 1931. F. PATZSCHKE 1,824,098
AGRICULTURAL MACHINE
Filed June 17, 1929

INVENTOR:
Fritz Patzschke

Patented Sept. 22, 1931

1,824,098

UNITED STATES PATENT OFFICE

FRITZ PATZSCHKE, OF LEIPZIG, GERMANY

AGRICULTURAL MACHINE

Application filed June 17, 1929, Serial No. 371,634, and in Germany June 19, 1928.

In agriculture, it is a well known fact that a good deal of young sugar-beet plants have to be again removed from the soil for the purpose of obtaining a better and stronger growth of the remaining plants. It is a known fact too that the removal of the beet plants in question constitutes for the farmer a hard and an intense work taking up much time. The present invention which obviates this drawback, relates to improvements in agricultural machines and more particularly to a machine for cutting off young beet plants; and it consists of certain parts and details and combinations of the same, as will be fully described hereinafter and then pointed out in the claim.

Figure 1:
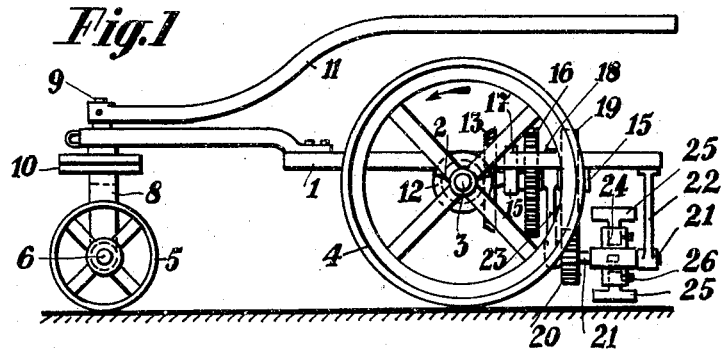
Figure 2:
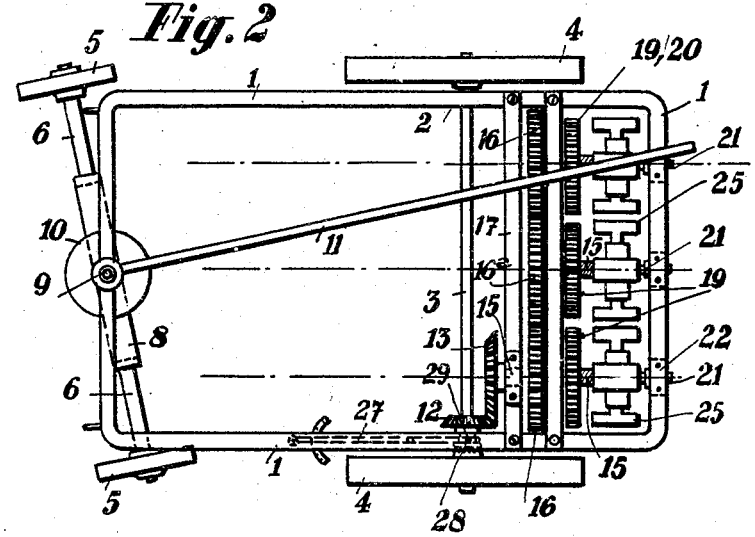
Figure 3:
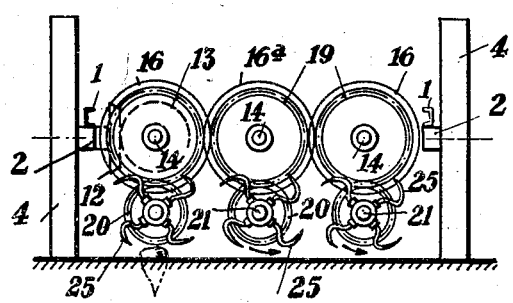

Reference is to be had to the accompanying drawings, forming a part of this specification, in which similar characters of reference indicate corresponding parts in the views shown. In these drawings:

Figure 1 is a side elevation of the machine,
Figure 2 is a plan view of the same, and
Figure 3 is a front view thereof with partly a cross-section.

The machine is coupled in the usual manner to a two-wheeled fore-carriage and consists of a frame-structure 1 provided with two pivot-castings 2 for the trailing axle 3 with the running wheels 4. The axle 6 of the fore-carriage, carrying the wheels 5, is supported by a shackle 8 which is made movable about a crank pin 9 of the frame 1. The said shackle 8 and the said frame 1 are each provided with ring-shaped gliding surfaces 10 arranged one above the other and assuring a good movableness to the fore-carriage. On the crank pin 9 is mounted a steering lever 11. the free extremity of which reaches across the whole length of the machine and which may be operated by the attendant.

Keyed to the rear axle 3 is a driving spur bevel wheel 12 meshing with a driven spur bevel wheel 13, the axle 14 of which is supported by two bearings 15 of the cross-bars 17. Furthermore, the said axle 14 carries a spur wheel 19 in engagement with a spur wheel 20 of smaller size mounted on the shaft 21 which carries the cutting knives 25. The said shaft 21 is journaled in bearings 22, 23 connected to cross-bars 18 and to the machine frame respectively. In the example shown, there are provided three shafts 21 which are arranged at a certain distance from one another, and this distance has of course to correspond to the distance of the plant rows from one another, so that each shaft 21 when in operative position, is being exactly placed above one plant row.

To each of the said shafts 21 is secured a support 24 in the shape of a disc, carrying cutting knives 25 which are connected to the said support 24 in a removable and interchangeable manner. The said cutting knives are preferably made in the shape of a U, and each knife is provided with a shank adapted to be introduced into a radially arranged hole of the support 24 in which it may be fastened by means of a screw 26. The cutting edge of the knives may eventually be disposed in oblique direction with relation to the shaft 21 so as to obtain gradually an intense working of the knives and a more regular working of the machine. The said knives are arranged in such manner as to enable them to penetrate with their edge into the soil thereby cutting off the beet plants unto a certain depth.

All the knife shafts 21 are being rotated in one and the same direction by means of spur wheels 16 keyed to each axle 14 and meshing with loosely mounted wheels 16a so that, owing to the rotation of the first axle 14, all the axles 14 will be rotated at the same time. When the machine is in operative position, the rotation of the rear running wheels is transmitted in an appropriate manner to the cutting knives. The breadth of the knife blades is so proportioned that they cut off beets out of the plant rows in a reach of about six inches, whereas about one inch will remain undamaged. Owing to the intervals of the beet plants being variable, a uniform rotation of the knives seems not to be an advantageous one, and therefore the hereinafter described arrangement is being provided causing the knives to come a standstill from time to time. For this purpose, the driving spur bevel wheel has a certain number of its teeth cut off, and as the thus obtained spaces on the toothed periphery correspond in their intervals with the number of the knives for each knife support, the meshing of the driven spur wheel 13 will be temporarily interrupted. The toothed periphery of the spur wheels 20 may likewise be provided with free spaces so as to enable a suitable displacement of the different toothed wheels 19 with respect to one another and to cause the knives of the different knife supports to work in succession.

The driving spur wheel 12 is provided with a flat key and is therefore adapted to be displaced in axial direction so as to be brought in engagement or out of engagement with the spur wheel 13. This off position is of great advantage for the machine while it is travelling to the field and is on the field paths. The displacement of the driving wheel 12 may, for instance, be obtained by the pin 28, secured to the double-armed lever 27 and entering a groove 29 provided in the wheel boss. The said hand lever 27 can be fixed in position by means of any retaining device.

The cutting knives may be arranged at the left hand side or at the right hand side of the rear axle 3.

What I claim as new, is:

In an agricultural machine of the character described, in combination with a wheeled frame-structure, a rear shaft, and a driving spur bevel wheel, the arrangement of a second shaft, a third shaft, driven spur bevel wheels, a disc-shaped support mounted on and rotating with the said third shaft, cutting blades mounted removably and interchangeably on said support, loosely mounted wheels in mesh with said driven spur bevel wheels and causing them to rotate in one and the same direction, the said driving spur bevel wheel having a certain number of its teeth cut off so as to obtain a temporarily interrupted mesh with the driven spur bevel wheel, a flat key in connection with the driving spur wheel and allowing the latter to be displaced in axial direction and to be brought in engagement or out of engagement with the driven spur bevel wheel, a double-armed lever, a pin secured thereto and intended to enter a groove provided in the wheel boss, and means for fixing in position the said double-armed lever.

FRITZ PATZSCHKE.